J. L. BYRAM.
RAKE CLEANER.
APPLICATION FILED MAY 26, 1914.
1,140,663.
Patented May 25, 1915.
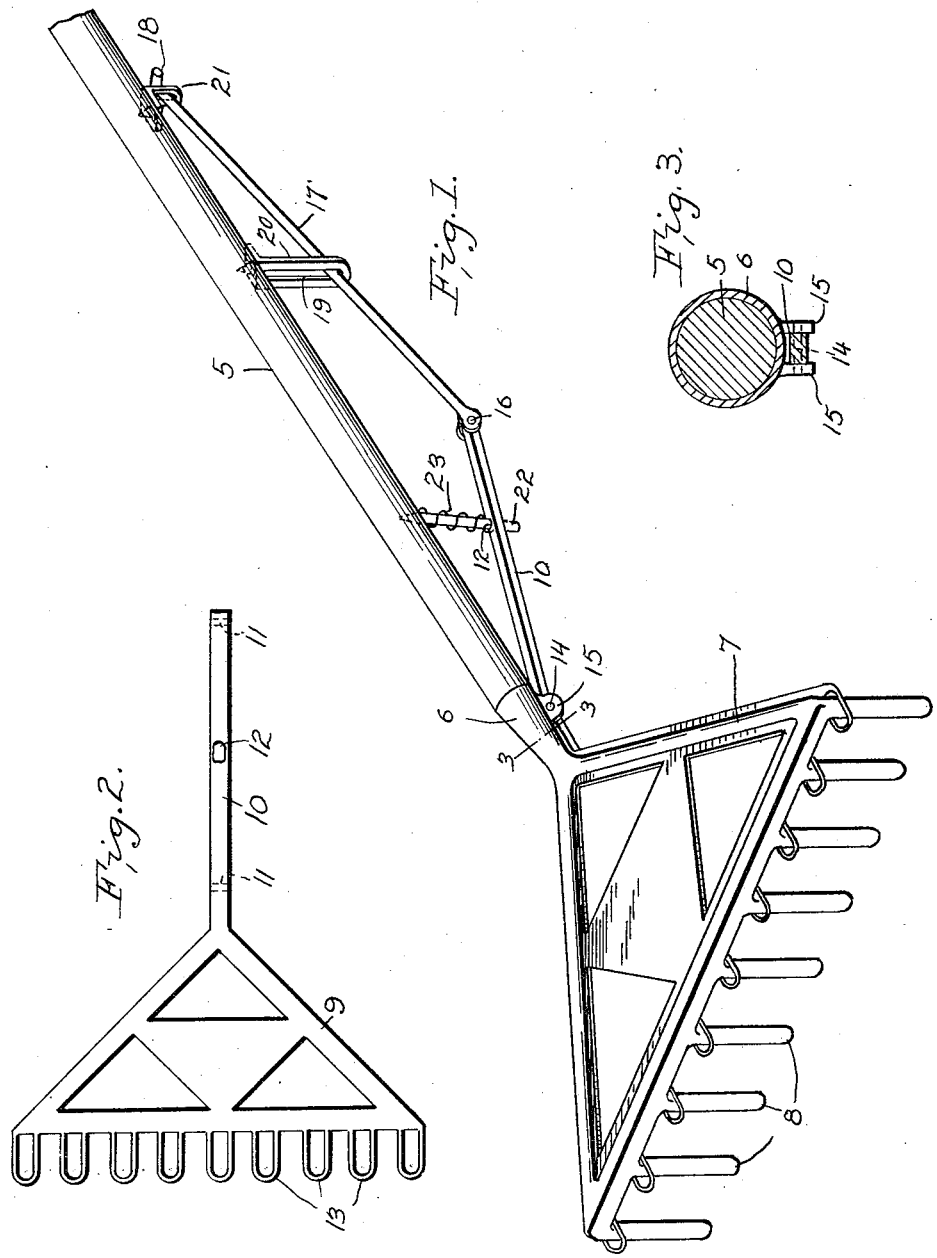
Inventor
J. L. Byram

UNITED STATES PATENT OFFICE.

JOSEPH LEE BYRAM, OF CLEMENTS, KANSAS.

RAKE-CLEANER.

1,140,663.　　　　　Specification of Letters Patent.　　Patented May 25, 1915.

Application filed May 26, 1914.　Serial No. 841,013.

*To all whom it may concern:*

Be it known that I, JOSEPH LEE BYRAM, a citizen of the United States, residing at Clements, in the county of Chase and State of Kansas, have invented certain new and useful Improvements in Rake-Cleaners; and I do hereby declare the following to be a full, clear, and exact description of the invention, such as will enable others skilled in the art to which it appertains to make and use the same.

This invention has relation to devices for cleaning the teeth of rakes, and has for its object to provide a device of this character which shall be simple and inexpensive to manufacture and quickly and conveniently attachable to practically any type of lawn rake.

With the above and other objects, the invention consists in the novel construction, arrangement and formation of parts as will be hereinafter specifically described, claimed and illustrated in the accompanying drawings in which, Figure 1 represents a perspective view of a rake showing the application thereto of my improved cleaner. Fig. 2 represents a top plan view of the cleaner member removed, and, Fig. 3 represents a transverse sectional view on the line 3—3 of Fig. 1.

Referring to the drawing in detail, wherein similar reference numerals designate corresponding parts throughout the several views, the numeral 5 indicates a rake of ordinary construction secured in the socket 6 of the rake head 7 provided with a plurality of teeth 8.

The rake cleaner frame comprises a substantially triangular body 9 carrying a shank 10 formed adjacent its opposite ends with apertures 11, and through its medial portion is an aperture 12 extending at right angles to the apertures 11. The front end of the body 9 is formed with a plurality of loops 13 corresponding in number to the number of rake teeth 8 and adapted to receive the latter, as clearly illustrated in Fig. 1. A pair of depending ears 15 are formed on the under side of the socket 6 and receive a pin 14 extending through the inner apertures 11 of the crank 10 for pivotally supporting the cleaner frame. As clearly illustrated in Fig. 1, the shank 10 is directed angularly from the body 9 whereby the free end of the shank 10 is normally spaced a distance from the handle 5. A pin 16 extending through the outer apertures 11 and through apertures formed through a pair of ears in a slide bar 17 pivotally connect the latter with the shank 10. A cross bar 18 is formed at the free end of the slide bar 17 and constitutes a handle for operating the rake cleaner. The medial portion of the slide bar 17 is slidably mounted in a slot 19 formed in a bracket 20 rigidly secured to the under side of the handle 5, and the outer end of the bar 17 is slidably mounted through a slot formed in a second and smaller bracket 21 against which the handle 18 is adapted to engage for limiting the movement thereof as the cleaner frame is moved to normal position under the influence of the spring to be hereinafter described.

A pin 22 is secured in the under side of the handle 5 and is slidably mounted through the elongated aperture 12 in the shank 10, a spring 23 is disposed on said pin between the handle and the shank for normally retaining the latter spaced from the handle and for holding the frame 9 snugly against the under side of the rake head 7.

In use, when it is desired to clean the teeth 8, the handle 18 is grasped by the operator and pulled longitudinally inwardly toward the operator thereby rocking the cleaner frame on its pivotal axis 14 and moving the loops 13 downwardly toward the free end of the teeth 8, thus effectually cleaning the latter. When the handle 18 is released the spring 23 automatically returns the cleaner to inoperative position.

What I claim is:—

A device of the character described comprising a handle, a rake head secured to said handle, teeth on said head, a cleaner frame including a plurality of loops receiving said teeth and a shank pivotally secured adjacent its inner end to said handle and extending angularly therefrom, said shank having an elongated opening adjacent its medial portion, a pin secured to said handle and extending through said opening for limiting the lateral movement of said shank, a spring positioned on said pin between said shank and said handle for normally retaining the cleaner frame in inoperative position, a slide bar pivotally secured to the free end of said shank, brackets secured to said handle and slidably receiving said slide bar, a handle on said slide bar adapted to engage one of said brackets to limit the movement of said slide bar in one direction.

In testimony whereof I affix my signature in presence of two witnesses.

JOSEPH LEE BYRAM.

Witnesses:
JOHN B. HANNA,
J. N. HANNA.